June 27, 1967  R. J. ANDERSON  3,328,259
DRESSING FOR A WOUND CONTAINING A HEMOSTATIC AGENT
AND METHOD OF TREATING A WOUND
Filed Jan. 8, 1964

INVENTOR.
ROBERT J. ANDERSON
BY
Towson Price
ATTORNEY

United States Patent Office 3,328,259
Patented June 27, 1967

3,328,259
DRESSING FOR A WOUND CONTAINING A HEMO-
STATIC AGENT AND METHOD OF TREATING A
WOUND
Robert J. Anderson, Bloomfield, N.J., assignor to
Parachem Corporation, New York, N.Y.
Filed Jan. 8, 1964, Ser. No. 337,709
19 Claims. (Cl. 167—84)

This application is a continuation-in-part of my pending application, Ser. No. 782,515, filed Dec. 23, 1958, and similarly titled, now abandoned.

This invention relates to a film-like bandage, sterile or adapted to be sterilized and made antiseptic and/or anesthetic for first aid treatment to promote healing of wounds, control infection, pain and the like, soluble in plasma and water at any temperature, hemostatic at body temperatures, non-toxic, and which may be formed dense or aerated; comprising a flexible self-supporting porous sheet which may be given a pH to coincide with the maximum effectiveness of a contained medication, that will adhere to the skin when moistened, that is absorbable, and with an adjustable tensile strength.

In its composition aspect, the present invention resides in the concept of a water-soluble protective film of a compound selected from the group consisting of water-soluble cellulose compounds including alkali metal salts of carboxy methyl cellulose, hydroxy ethyl cellulose, polyoxyethylene, starch, casein and the like, a plasticising compound selected from the group including humectants, liquid saturated acyclic alcohols and a thermoplastic innocuous material such as a polyethylene glycol; and desirably a detergent for fast solubility, emulsification and the lowering of surface tension.

In its process aspect, the invention relates to using such a bandage to cover, protect and promote the healing of wounds and other like benefits dependent on medication incorporated in the bandage.

It has been observed that devices such as adhesive bandages, as for example, those sold under the trademark "Band-Aids," and non-porous coatings applied as liquids, as used in the protection and/or treatment of cuts, sores and infections, leave much to be desired. Non-porous protective films were found to be quite unsatisfactory due to the fact that they do not permit access of air to wounds; a necessary condition in the healing operation. "Band-Aids" have been designed to eliminate this objection. They are, however, undesirably bulky and have to be replaced constantly in order to permit proper care of the wound.

In the past, treatment of open lesions such as are caused by burns, wounds and the like, the dressing which had been applied thereto, to supply medication or to serve as a protection against infection, has frequently interfered with rapid healing. When an ordinary dressing is applied to a moist lesion, the scab or granulation tissue formed at the surface of the lesion frequently becomes incorporated with the dressing so that the scab or new skin formed during the healing process may be pulled away when the dressing is removed, causing secondary hemorrhage, pain and the like.

A further disadvantage of past dressings has resulted from the fact that when a medicament has been required in the treatment of an open lesion, it has been necessary to apply a fresh dressing to the lesion at frequent intervals, usually as often as at least once each day to replenish the medicament, resulting in disturbance and irritation of the lesion. Attempts have been made to overcome these disadvantages, which are inherent in ordinary surgical dressings, through the use of non-fibrous films. However, such films have been so stiff and harsh that they could not conform evenly to the surface of the lesion and they have had an irritating effect thereon which was not conducive to speedy healing.

I have discovered that it is possible to prepare a soft, pliant film which can be applied evenly to the surface of a moist lesion, which will not irritate the lesion, with no normal need for removal, but will become incorporated with a scab or granulation tissue formed therein, by modifying a quantity of a water soluble cellulose compound with an appropriate plasticizing agent and a proportion of water. The film so formed also possesses sufficient cohesion to provide a resilient support when used as a dressing and to permit its being molded to conform with the contour of a part of the body, such as a hand.

It is a particular feature of my invention that I may incorporate in the film a chemotherapeutic agent which is slowly released therefrom in an effective quantity in a form in which it is miscible with the body fluids, thereby obviating the necessity for frequent changes of the dressing of a wound which requires medication. It is a further and important feature of my invention that the soft, pliant, adherent film can be reinforced by embedding a textile material in the outer surface thereof.

In the Australian Patent No. 121,334 to Moos, there is disclosed a surgical dressing of sulfonamide compounds which has a cellulose derivative, preferably methyl cellulose, for holding the compound on the skin. Methyl cellulose does not have the porosity and solubility desired by applicant, as distinguished from the bandage of the present applicant, which after application to the skin is porous and will combine with the body fluids to produce an artificial eschar which then becomes insoluble in water. From the examples given, it appears that the Moos dressing is a mere means of applying a sulfonamide to a wound in a prescribed amount or area involved. The cellulose compound is apparently little more than a binder for the sulfanomide and intended to exclude air.

In the U.S. Patent No. 2,429,404 to Dixon et al., there is disclosed a film-forming solution which can be sprayed on a burn or wound to form an eschar. In the treatment of burns, it is generally considered that an early formation of a sterile or uninfected eschar is of primary importance. The proposed medicament was previously applied to a burn in a triethanolamine solution and it took three days to form an eschar. In accordance with this patent, methyl cellulose has been added and the time of eschar formation cut down to about a day.

The invention of the present application is based on the fact that a precast eschar can be applied immediately and handled like a bandage. Said eschar is transparent, antiseptic, and may be partially dissolved by exudate from sores to form adhesive contact and release the medication. An eschar so formed has porosity similar to a natural eschar and healing and hemostasis progresses rapidly. On the other hand, the film around the wound can be removed by treatment with water without disturbing the wound in any way.

In the U.S. Patent No. 2,510,993 to Meyer et al., there are disclosed the formation of aqueous solutions of compounds of sulfadiazine and salts of salicyclic acid, with particular relation to compounds of this type that yield stable aqueous solutions adapted to be administered by injection. Extensive clinical tests have shown that the product sulfadiazine and an alkali salicylate is a most effective cure for streptococcus and penumococcus infections, as well as being a wonderful healing agent for wounds and secondary infections of all kinds, doing about everything that penicillin does without the frequent side effects. I, therefore, propose to incorporate this material in films embodying my invention.

In the U.S. Patents Nos. 2,772,999 and 2,773,000 to Masci et al., an improvement in the hemostatic quality of surgical dressings and bandages is disclosed, using a free acid carboxy methyl cellulose or carboxy ethyl cellulose. The surface of gauze dressing is impregnated with a hemostatic agent, in this case carboxy methyl or ethyl cellulose or a salt thereof. They have demonstrated by the treatment of rats, that bleeding time can be reduced from five minutes to one minute, fifteen seconds, due to the hemostatic quality of the cellulose compound, without the necessity of applying pressure.

In the second of said patents, there is disclosed the addition of a poly-ol compound to act as a stripping agent and allow for convenient removal of the bandage. However, an all cases the cellulose compound is treated to obtain free acid cellulose ether, as by heating, to form such as the refractory free acid carboxy methyl cellulose. Implantation tests show that the free acid cellulose ether was completely absorbable by the body.

The important differences in my invention, as compared with those of the above patents, is that I have created an unsupported medical film or bandage which is soluble in blood plasma and weeping secretions, combines with and coagulates the blood by its inherent hemostatic qualities derived from the film-containing cellulose glycolic acid ether, and has the physical property of containing the blood flow, to promote coagulation, with a film or bandage which need not be removed from the wound and which film may carry medicaments suitable for treating an infection and the like. My film need contain no tackifier as the inherent solubility of the film in water allows for adhesion to the skin.

However, when the bandage is used on dry skin for the treatment of skin infections, the problem of adhesion becomes more difficult.

To overcome this condition, I propose to incorporate a non-toxic thermoplastic product that is softened at body temperature to give adhesion and flexibility to the dressing. The products I have found most suitable are the polyethylene glycols, such as those having a molecular weight of about 1000, having a melting point around 100° F. or body temperature. However, lower molecular weight polyethylene glycols that are liquid at room temperature are also effective. These properties are particularly important where the bandage may be used on areas subject to friction or abrasion.

Example: Treatment of fungus infection of the feet, where the medication is kept in contact with the infected area all day.

The above materials are all intended for use externally, but I have developed the concept of use for internal bleeding. In view of its solubility, it should be absorbable.

It is, therefore, an object of my invention to provide a material which (1) coagulates the blood, (2) allows for the transmission of air, (3) gives adequate protection against foreign matter. (4) It may have incorporated therein medicinal matter such as germicides, anesthetics and so forth, and (5) can be removed from the skin by redissolving in water.

Another object of my invention is to provide a self-supporting film of a substantially uniform thickness comprising a water soluble cellulose compound, a plasticizer and, in the alternative, a skin treating agent.

A further object of my invention is to provide a self-supporting film as above set forth in which the cellulose compound is sodium carboxy methyl cellulose, or hydroxy ethyl cellulose, in which the plasticizer is glycerol, and in which the treating agent, if used, is iodine, and/or antibiotics.

A still further object of my invention is to produce material which may be used to apply a precast eschar to the skin in the form of a water-soluble transparent porous film which can be handled like a bandage, is antiseptic, and is partially dissolved by exudate from sores to form adhesive contact and release medication.

An additional object of my invention is to provide a self-supporting soluble film which may be applied as a healing covering over even an exuding sore on the skin, make an artificial eschar thereover, retard the flow of plasma therefrom, and avoid the formation of blisters.

These and other objects and advantages will become apparent from the following detailed description when taken with the accompanying drawings. It will be understood that the drawings are for purposes of illustration and do not define the scope or limits of the invention, references being had for the later purpose to the appended claims.

In the drawings, wherein like reference characters denote like parts in the several views.

Figure 1:
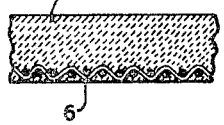
FIGURE 1 is a traverse section, greatly enlarged, of a reinforced film embodying my invention.

One of the first requirements of my invention is the development of a film that is water-soluble, has very good tensile strength when dry, and is flexible enough to be handled readily without damage. Such a film also has to be a pure product that is free from toxicity. A primary requirement is a material that will afford the same protection as a clot of blood, with equivalent air transmission. In others words, I desire to synthetically produce a protective material that is the equivalent of nature's method of protecting sores. The choice of products approximating these qualifications include water soluble cellulose derivatives such as the following, which are cited as examples.

Sodium and other alkali metal salts of carboxy methyl cellulose
Hydroxy ethyl cellulose From the above description it is obvious to those skilled in the art that the following are examples of materials that may be substituted for those above listed as equivalents for my purpose.

Other soluble cellulose compounds: Starch, casein, polyvinyl alcohol, inulin.

In addition to the above, several new water-soluble polymers have come on the market, and I propose to take advantage of their properties for developing new possibilities for water-soluble bandages.

(1) "Polyox" manufactured by Union Carbide Corporation is a polyoxyethylene, readily water-soluble, thermoplastic and can be extruded into strong elastic films. It will adhere to itself when the surface is moistened, and has excellent qualities for the production of strong dry bandages.

(2) "P.V.P." (polyvinylpyrrolidone) manufactured by Antara Chemicals, was developed in Germany and used as a blood extender during World War II. It is now manufactured in this country and has found extensive use in pharmaceutical products. It is nontoxic, and its detoxifying properties have made it possible to use an iodine polyvinylpyrrolidone complex as a mouthwash. It is water-soluble, a good film former and compatible with water-soluble cellulose polymers. Its incorporation in the film permits the use of antiseptics that would otherwise be too toxic.

Of the compounds above mentioned, I propose to specifically consider sodium carboxy methyl cellulose. This product may be obtained from suppliers, an example being Hercules Powder Co., in such a pure condition that it is edible, being used as a thickener in products such as ice cream. A preferred grade 7L is readily soluble in water and, when plasticized by a material such as glycerol, can be formed into a film of great clarity and excellent tensile strength. Other plasticizers are sorbitol, and ethylene glycol. After forming, such a film is readily redissolved in water and can be cast in various thicknesses from a water solution, with or without aeration, as on a heated drum or belt, the mechanical development of which will be described later.

Tests have been conducted on simple cuts and it was found that the film would not only coagulate the blood, but would also combine with it, forming an artificial eschar which permitted healing thereunder. Repeated washings merely diminished the thickness of the film around the sore and gradually removed it as the healing progressed.

A further embodiment of my invention is the inclusion in the film of antiseptic, medicinal, germicidal and/or antibiotic materials in order to minimize infection or to cure such after it has occurred. A primary embodiment of this idea is the incorporation of iodine into the film. At the present time there is no entirely satisfactory method of dispensing iodine. It is sold today in low percentage alcoholic solutions, but the initial percentage of a fresh bottle is not maintained because repeated usage results in evaporation of the alcohol itself, concentrating the content of the iodine to a point where it may become dangerous. I have been able to incorporate iodine into my film so that it has a definite content whereby the film can be dispensed in small book form or as loose leaves in a container.

A still further embodiment of my invention is the incorporation of sulfa drugs in the film. Due to their antiseptic properties in surface infections, an easy method of using them by the general public would undoubtedly arrest the danger of serious infection in a great many cases. Development work shows that while sulfa drugs are not soluble or compatible with my film, they can be dispersed therethrough and are maintained in the dried film in a uniform surface content. There is, therefore, no limit to the concentration of the drug in the film. The same procedure can be followed in the use of other healing agents that are now known to the medical profession, the only limitation in this respect being the effect of heat in the process of film development.

Although a film embodying my invention may be used in unsupported form with or without various antiseptic and/or drug materials, yet, if it is desired to make it stronger, it may be reinforced as by coating cotton or fabric with the film-forming solution, with or without the various drugs, and drying to produce a smooth film coating. In places where adhesive tape is now used and has serious objections due to the difficulty of its removal, no such problem would be encountered with a cellulose-coated fabric embodying my invention. It would merely suffice to soak this tape or bandage in water to readily remove it.

Generally speaking, a film of the type embodying my invention would be of great help to the medical profession in performing operations. Film of this kind can be used to arrest the flow of blood and no removal is necessary as it would gradually be absorbed and disappear in the system. Such a film may be used to close cuts with avoidance of the use of stitches. It is considered that it may be used in such infections as athlete's foot, fungue growths, poison ivy, etc. Such infections are spread unintentionally by individuals. A protective film over the sore will localize the infection, at the same time providing the correct form of medication. Being transparent, observation of the sore is permitted without removal.

The film is normally prepared from a mixture of approximately 70 to 85 parts, by weight, of a carboxy or hydroxy alkyl cellulose; e.g. hydroxy ethyl cellulose or a soluble alkali metal salt of carboxy methyl cellulose, together with 15 to 30 parts, by weight, of a suitable plasticizer such as glycerol.

While either hydroxy ethyl cellulose or a water-soluble alkali metal salt of carboxy methyl cellulose (e.g., the alkaline earth metal salts or the ammonium, sodium or potassium salt thereof) is operative as the base material in the practice of the present invention, sodium carboxy methyl cellulose is preferred, and particularly that having a substitution of at least 0.3 to 1.2 and usually from 0.65 to 0.95; substitution referring to the average number of sodium carboxy methyl groups per anhydroglucose unit of the cellulose structure, each unit having three reactive hydroxy groups (i.e., if complete substitution of sodium were obtained the substitution number would be 3.0).

These base substances in addition to being rapidly water-soluble, should possess a maximum concentration and minimum viscosity; hence the viscosity thereof should not exceed 1000 centipoises (cps.) and most desirably should be in the range of from 10 cps. to 750 cps. The term "viscosity" as employed herein is expressed as the logarithm of the viscosity in centipoises at 25° C. of a 2 percent aqueous solution of the carboxy or hydroxy alkyl cellulose employed.

The plasticizer selected for use herein while not narrowly critical is normally a liquid saturated acycylic alcohol, substituted or unsubstituted, containing normally not in excess of six hydroxy groups. Illustrative of these are glycerol, diglycerol, glycerol $\alpha$ monomethyl ether, glycerol monochlorohydrin, 1,2,6,-hexanetriol, ethylene glycol, propylene glycol, 2,3-butylene glycol, 2-nitro-2-methyl-1, 3-propanediol and ethanolamines such as 2,2'-dihydroxydiethylamine, 2-hydroxy ethylamine and the like.

Films embodying my invention may be generally free from air or purposely aerated, as by agitation to be described, so as to have an air content of preferably about 30% to 40% by volume in the form of very small bubbles.

When aerated, the film has a spongelike quality and is immediately soluble in plasma or body fluids, causing hemostasis. The potential of my concept goes beyond a plasma-soluble or hemostatic bandage. I propose to provide a dressing or carrier for medicaments that would adhere to the skin by merely wetting the surface and would release the medication rapidly and more completely than the petrolatum bases used today. For instance, in the treatment of fungus infections of the feet, the powder or salve used at present rubs off inside the shoe and consequently the medication is only in contact with the infected area for a short period. My bandage, containing the anti-fungus medication, on the other hand, would stay on until the next shower, and more important would isolate the infected area and keep it from spreading.

I consider the film as a means for effecting a treatment rather than as a mere bandage, because it can do much more than the present concept of a bandage. This dressing can be applied to an open lesion, causing hemostasis; it can contain an anesthetic, a germicidal agent and does not have to be removed.

I have explained that, due to its plasma solubility, this bandage will adhere to an open wound. However, as I have noted, this bandage has unique properties for the treatment of skin infections. The problem of adhesion is more difficult here. This is overcome by the addition of a polyethylene glycol.

The moisture content of a sodium carboxy methyl cellulose or hydroxy ethyl cellulose film has more effect on its plasticity than a plasticizer per se. In fact, if the proper moisture content of the film could be controlled, it would be unnecessary and perhaps undesirable to use a plasticizer in the film. As it happens that the water-soluble plasticizers are also humectants, their selection should be based on their ability to control the moisture content of the film under exposure to very high and low humidity conditions. As it is desirable to have a low water content at high humidities and a reasonably higher water content at low humidities, the compatible products would primarily include the polyethylene glycols, 150, 200, 300 as well as triethanolamine and sorbitol.

I have demonstrated that it is possible to inject moisture into the sealed bandage package, rendering the bandage soft and adhesive. The proper humectant would maintain this condition during the shelf life of the product.

The hydroxy ethyl cellulose and polyethylene glycols mentioned are thermoplastic and at body temperature keep the plasticity of the film, and the humectant maintains the water content of the film, so that medication is kept in moist contact with the wound or infection, at the same time maintaining air and moisture transmission through the film. Humectants that are particularly suitable are polyethylene glycols, having molecular weights of about 150, 200 and 300, triethanolamine, sorbitol and alkanolamine sulfamates.

I have found that the inclusion of a non-toxic detergent is a desirable component of my bandage. I have shown its function as an emulsifying agent, where aerated films of uniform air transmission may be produced. Due to its solvency in body fluids and reduction of surface tension, it greatly enhances the release of medication and its penetration into the skin.

Most of the effective drugs that would be a component of this dressing are very expensive and it is important that they be effectively and completely consumed for the purpose they are intended. It is my contention that ointments or salves are inefficient vehicles for medication for the following reasons:

(1) They do not release the medication effectively because they are not soluble in body fluids.

(2) A high proportion of the medication never reaches the infection.

(3) An optimum amount cannot be applied, because the application is haphazard.

I have found that the films I propose to use can be gas-sterilized very satisfactorily as by ethylene oxide and $CO_2$. This showed no discoloration or other breakdown after 72 hours in the sterilization chamber. When individual bandages are packaged, the moisture of sterilization gives an added flexibility to the film, the optimum condition for moist contact with the skin. It is, therefore, contemplated that after the bandage material is cut and individually packaged, it will be sterilized and then placed in boxes or other packages, overwrapped with an airproof material to maintain its moisture content in prolonged storage, and of course maintain its sterile condition.

The basic bandage without medication has been stored for several years without any chemical change. The ultimate stability will depend on the medication used and its resistance to hydrolysis in the presence of moisture.

This bandage material is to be cast on a machine, as described, whereby the film can be made in any desired thickness, rigid or flexible, dense or aerated without a supporting membrane. The medication and coloring, if needed, will be dispersed through the batch prior to casting and the machine temperature controlled to avoid any deleterious effect on any of the components. This operation will be continuous and the film may be cut into sheets of any convenient size as it comes off the machine.

It will be readily apparent that this bandage material can be coated on a fabric backing and be used as a conventional bandage. Application to a moist surface will release medication and give adhesion. It will also be possible to coat thin polyurethane sheets with the bandage materials so that it could be applied to wounds to give the treatment we have described plus protection from further damage by the polyurethane aerated sponge type material.

Polyurethane foam has not been used for wound dressings because it does not absorb body fluids and keep the wound surface dry. A very complicated attempt has been made to overcome this shortcoming by using a rayon pad between polyurethane with wicks through the polyurethane to draw off body fluids from the wound surface. Polyurethane foam is superior as a wound cover because, in comparison with gauze dressing, it is softer, less adherent, more resilient and does not react with body tissue.

It will be readily apparent, therefore, that polyurethane foam pads coated on one side with my film-forming bandage material would overcome the objections to the use of polyurethane as a surgical dressing. It would be superior to the laminated dressing in keeping the wound dry, and would be a treatment at the same time, antiseptic and in most cases need not be removed until the wound had healed, when the eschar would come off with the bandage. For this reason the economy in use would be obvious.

*Example 1*

As a typical solution for the preparation of films embodying my invention, I may take 8.73 grams of sodium carboxy methyl cellulose and together with .87 gram of glycerol, dissolve in 90 grams of water. If desired, it may be mixed with some antiseptic, such as .2 gram iodine and .2 gram potassium iodide. The solution is dark green in color. When made into a film, the formula thereof as finished, disregarding the water content, is 87.27% sodium carboxy methyl cellulose, 8.73% glycerol, 2% iodine and 2% potassium iodide. Such a film is clear and one square inch thereof dissolves in water in 1 minute, 15 seconds. It has good flexibility, moderate elasticity, and although sheets of the film show a very slight tendency to stick together under compression, they can be separated easily. Although there was only a very small amount of free iodine in the film, there was a similarly large amount combined therein. This combined iodine is easily displaced and free iodine obtained in quantity with a reagent such as chlorine gas.

*Example 2*

As another example of films embodying my invention, I may take 8.2 grams of sodium carboxy methyl cellulose and together with .8 gram of glycerol dissolve in 90 grams of water. If desired, it may be mixed with some antiseptic such as 1 gram of sulfanilamide. The formula of the film formed from this solution, disregarding the water content, is 81.82% sodium carboxy methyl cellulose, 8.18% glycerol and 10% sulfanilamide. Such a film is clear, readily soluble, has good flexibility, although low elasticity, and its sheets do not stick together under compression. Such films can be separated from the skin in one piece when dry. The film so manufactured was filled with white blotches.

*Example 3*

As a further solution for the preparation of films embodying my invention, I may take 9.6 grams of sodium carboxy methyl cellulose, 2 grams of glycerol and dissolve in 85 grams of water. If desired, I may mix with it 1.3 grams of sulfathiozole. Although this has a smaller percentage of water than the previously mentioned examples, in an effort to increase the thickness, it was found that the reduction of water did not materially increase such thickness. The film removed easily from the machine, such as will be disclosed and, in finished form, contained about 10% of the medication.

*Example 4*

| Composition of solution: | Gms. |
|---|---|
| Sulfanilamide | 0.1 |
| Sodium carboxy methyl cellulose | 9.0 |
| Glycerol | 0.9 |
| Water | 90.0 |

| Composition of film after being cast on machine: | Percent |
|---|---|
| Sulfanilamide | 1.0 |
| Sodium carboxy methyl cellulose | 90.0 |
| Glycerol | 9.0 |

Solubility: A one inch square of the film dissolves in water at 26° C. in 1 minute, 10 seconds.

Example 5

| Example of aerated film: | Gms. |
|---|---|
| Sulfanilamide | 0.1 |
| Sodium carboxy methyl cellulose | 9.0 |
| Sodium lauryl sulphate | 4.0 |
| Gylcerol | 0.9 |
| Water | 90.0 |

This solution after mixing for complete solution was passed through homogenizing mixer to reduce viscosity and aerate solution, as will be described. It was then cast on "Teflow" belt, as will be described.

Example 6

| | Percent |
|---|---|
| Polyoxyethylene | 98 |
| Hexachlorophene | 2 |

This is an example of a strong dense extruded bandage for containment of a wound or the treatment of skin irritations.

Example 7

| | Gms. |
|---|---|
| Water soluble sulfadiazine (alkali salicylate, as disclosed in Patent No. 2,510,993 | 0.1 |
| Hydroxy ethyl cellulose | 9.0 |
| Polyethylene glycol | 0.9 |
| Water | 90.0 |

The above solution was cast into film by passing through "Teflon" belt equipment to produce a dense film, as will be described. To produce aerated film the solution was passed through machine before application to the belt, as will be described.

Example 8

| | Gms. |
|---|---|
| Lidocaine hydrochloride which is α-diethylamino-2,6-acetoxylilide hydrochloride | .2 |
| Sodium carboxy methyl cellulose | 9.0 |
| Sodium lauryl sulphate | 4.0 |
| Glycerol | 0.9 |
| Water | 85.9 |

Figure 2:
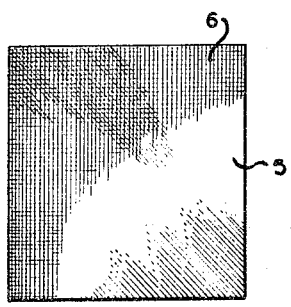
FIGURE 2 is an enlarged plan of a piece of reinforced film embodying my invention.

Referring to the drawing in detail, there is shown in FIGURES 1 and 2 a reinforced film 5 which may be prepared by depositing on a strip of gauze 6. Such a strip may be carried by the moving belt of the machine of FIGURE 4 and, during the corresponding operation, a solution embodying my invention may be deposited thereon. The gauze, after drying and stripping from the belt, will be embedded in the lower surface of the film. It may then be removed and wound up or cut into strips, as desired. When such a reinforced film is used as a surgical dressing, the face in which the gauze is embedded forms the outer surface of the dressing. The gauze is thus insulated from the wound by the soluble film which prevents the gauze from injuriously sticking thereto.

Figure 3:
FIGURE 3 is a perspective view of a non-adherent film embodying my invention and molded to fit a human hand.

Such a film-forming mixture embodying my invention may be applied to the outer smooth surface of a form, shaped to conform to one of the parts of the human body, such as a hand. The coated form may then be placed in an oven and heated to a suitable temperature until dry. At the end of the drying period, the form is covered with a film which can be stripped therefrom and resembles a glove, as illustrated in FIGURE 3. A film which has been formed in this manner may be used as a glove to cover the hand, for example, and forms a very effective surgical dressing for a part of the body which cannot be easily covered by conventional surgical dressings.

Figure 4:
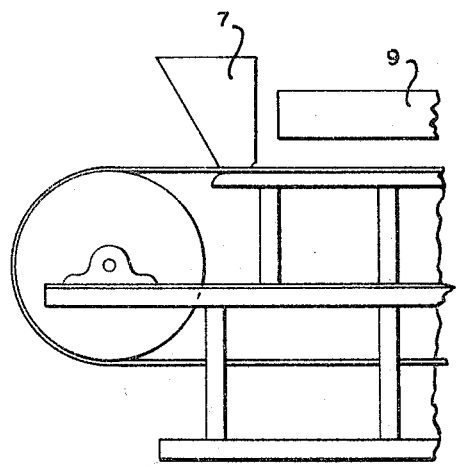
FIGURE 4 is an elevational view of a machine for manufacturing films embodying my invention.

The machine of FIGURE 4 for manufacturing film embodying my invention comprises a hopper 7 from which a film approximately .008" thick may be dragged out by the moving belt 8. The belt then passes through a heating zone provided beneath heaters 9 and excess water is evaporated therefrom, leaving a dry film on the belt. Such a film 10 is then removed as the belt goes around a drum 11, which may be belt-driven from a suitable electric motor 12. The film may be wound on a roller 13, suitably supported as illustrated. Release of the dry film from the belt is accomplished due to the non-adhering surface provided on the belt employing such material as poly(tetrafluoroethylene) sold under the trademark "Teflon." Such a surface is necessary in order that the dry film may be self-releasing.

A film composed of poly(tetrafluoroethylene) of "Teflon" which resin is described by M. M. Renfrew and E. E. Lewis, Industrial and Engineering Chemistry, vol. 38, page 870 (1946); R. C. Doban et al. Society of Plastic Engineers Journal, vol. 11, page 9 (November 1955) and P. E. Thomas et al., Society of Plastic Engineers Journal, vol. 12, page 6 (June 1956) and which is also described in U.S. Patent No. 2,230,654, is particularly desirable as the drying surface for the compositions of my invention; and indeed represents a significant improvement over other procedures employing, for example, a metal surface or the like.

A glass-coated fabric such as that sold under the trademark "Armalon" by Dupont; a metal coated platen or belt, or alternatively a heat-bonded film (e.g., by the procedure described by R. J. Wayne and W. M. Bruner, Society of Plastic Engineers Journal, vol. 11, page 10 (December 1955), attached to an under surface of a material which is heat resistant at the highest processing temperature for the protective film (e.g. 300° F.) and chemically inert, can by way of illustration, be employed. Where coated on glass or metal surface the thickness of the polymer is usually in the range of 3 to 10 mils. For heat-bonding to another surface composed of another material or poly(tetrafluoroethylene) or freely supported on an under surface, e.g., metal, canvas, thicknesses of from 20 mil or less to 120 mils are normally employed. Flms in excess of this thickness and preferably in excess of 200 mils are self-supporting.

Poly(tetrafluoroethylene), particularly that having a density of .035 and in a range of .030 to .040 and a softening point of about 620° F., is preferred due to the non-adhering surface it presents to the dried detergent film permitting ease of removal of the film therefrom. This property is so marked that non-ionic surface active agents included in the film composition for release thereof from the drying surface can be, and preferably are, omitted.

Figure 5:
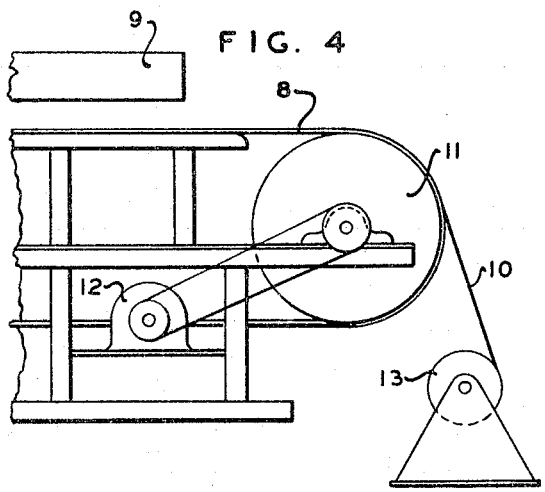
FIGURE 5 is a diagrammatic view of an alternative machine which may be used with that of FIGURE 4 for practicing my invention.

The machine of FIGURE 5 for aerating film-forming solutions embodying my invention comprises a reservoir 14 from which a solution of high viscosity is pumped through positive displacement pump 15, a portion being returned to the reservoir through cooling coils 16 and a portion going to the high speed mixer 17. Said mixer is desirably operated at a speed of about 3,450 r.p.m. in a counter-clockwise direction, when the connections are made as viewed in the drawing, so that the solution flows on to the approaching edges of the mixer rotor blades. From the mixer, the solution of lower viscosity is directed through the discharge pipe 18, and all of it is returned to the reservoir through pipe 19 controlled by needle valve 20, except that which is shunted to the applicator machine of FIGURE 4 through demand valve 21.

The purpose of the aforedescribed apparatus is to prepare my sodium carboxy methyl cellulose in combination with an emulsifying agent, such as sodium lauryl sulphate, and a suitable medicinal or antibiotic material, a plasticizer and water for continuous coating, drying and subsequent removal from belt of the "Teflon" or the like which is part of the machine of FIGURE 4. The apparatus achieves three main objectives, as follows:

(1) It reduces the viscosity of the solution from what may be approximately 100,000 centipoises to about 2,000 centipoises. This reduction facilitates metering the solution with uniform thickness to the "Teflon" belt.

(2) It reduces the density of the solution, as in emulsification, by introduction and dispersion of air in the form of very minute or microscopic pockets or droplets, thereby permitting removal of the solution, after drying, from the belt in continuous form.

(3) As a result of homogenous low density film, the solubility thereof in water after finishing is greatly enhanced. This is of the utmost importance insofar as usefulness of the finished product is concerned. The physical changes in the solution and in the film produced therefrom after finishing, brought about by high speed close tolerance agitation, are very important for the successful production of film which is rapidly soluble in water.

From the foregoing disclosure it will be seen that I have provided a self-sustaining film which may be produced from aqueous solution by introducing it onto the surface of a moving belt of poly (tetrafluoroethylene) or "Teflon" and heating said solution for a period sufficient to form a dried film thereon and then removing said film from said belt.

Drying of the liquid film is continued until its water content is about 5 to 15 percent of the weight of the film. A substantially smaller proportion of water than 5 percent gives rise to films which are too brittle for my purpose. A substantially larger proportion than 15 percent of water furnishes a film which is too soft and not readily handled.

Dried unaerated films whose thicknesses vary from about 0.001 to 0.006 inch are suitable for use as medical or sterile protective films. A desirable mean thickness for aerated films is substantially 0.01 inch. The thickness above the lower limit which is selected for unaerated films will depend on the use for which desired. If an unaerated film is too thick, its rate of solution in water becomes undesirably slow. Preferred thicknesses are in the range of .003 to .004 inch, and greater when aerated.

From the foregoing disclosure it will be seen that I not only propose to produce a film which is either aerated or not, medicated or not, but one which may be reinforced. When a water solution of my composition is aerated, as by passing through the equipment of FIGURE 5, the film so produced has almost instant solubility in water and body fluids. Such a film consequently has remarkable hemostatic and medicament-release qualities. Its value for stubborn bleeding, especially in internal operations, is readily apparent and the application thereof can be followed by subsequent bandages of other types for protection and containment. Equivalents, as indicated may be substituted.

From the foregoing, it will be seen that I propose to provide for the following:

(1) A hemostatic bandage, water and plasma soluble, aerated for air transmission and quick solubility, which does not have to be removed from the area of plasma contact, will wash from surrounding area but which is incorporated in the blood clot.

(2) The bandage or dressing may be made in continuous sheets, by special apparatus, cut into desired lengths, packaged, gas or radiation sterilized, and moisture added, to give the bandage maximum flexibility, adhesion and maximum medicament release.

(3) The bandage can be made at any desirable pH to create a climate of maximum medicament effectiveness. If medication therein should be water-soluble it will be activated by body fluids, and if it should be insoluble it will be released to the wound area by the solvency of the dressing in water or body fluids. It is this versatility that I must emphasize. I am also aware that the pH of the bandage is important, that the activity of certain drugs is enhanced by adjusting the pH of the vehicle to the most effective range, and this is readily accomplished. By the use of a non-toxic detergent producing increased solvency and lowered surface tension, the penetration and activity is enhanced. The detergent I recommend, sodium lauryl sulphate, has excellent emulsification properties for oils, and assists in carrying medication into the pores of the skin.

(4) The bandage can contain medicament that is not reactive in a neutral water solution, or if insoluble is dispersable through the film.

(5) The bandage may contain a local anesthetic, an antiseptic and tissue growth promoting agents which, in one application can fill the needs of the majority of first-aid requirements for wounds and infections. This bandage would contain a humectant, such as triethanolamine or sorbitol, to maintain the moisture content, and a detoxifying agent such as polyvinyl pyrrolidone. It can now be considered as a first-aid treatment because it may be hemostatic, antiseptic and anesthetic in one application, does not have to be removed, promotes healing and can be safely applied by anyone because the prescribed amount and only the prescribed amount can be applied to the wound area.

I find that lidocaine hydrochloride has excellent potential; it is stable within the temperature range that I need and does not hydrolize in the presence of moisture. It is freely soluble in water and consequently is immediately activated when the bandage or dressing is moistened for application, requiring minimum dosage.

Patents Nos. 2,764,159, 2,772,999 and 2,923,664 by Masci, Cook et al., describe the production and use of free acid carboxy methyl cellulose as a hemostatic product. Free acid carboxy methyl cellulose is now commercially available. Although it is not water-soluble, it can be dispersed through my bandage or dressing and accelerate hemostasis where it is necessary to use strong dense dressings, as where plasma flow is intense, such as at extensive burn areas. When used internally the dressings are non-toxic, hemostatic and absorbable.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A dressing for a wound comprising a flexible body large enough to cover an open lesion as a dressing, said body containing a water-soluble plasma-soluble cellulose derivative having hemostatic and film-forming properties and having the property of combining with the plasma in a wound to form with said plasma an artificial water-insoluble eschar, said cellulose derivative being present in integral non-discrete form in said body and in proportions to cause said body to be effective in coagulating the plasma issuing from a moist lesion to which the dressing is applied.

2. A dressing as described in claim 1, said cellulose derivative being in porous form.

3. A dressing as described in claim 1, said body also containing a medicant for the wound to which said body is applied.

4. A dressing for a wound as described in claim 1, said body being in the form of a flexible film, said dressing also having a flexible sheet on which said body is supported to form with said body a surgical bandage.

5. A dressing for a wound comprising a flexible body large enough to cover an open lesion as a dressing and containing sodium salt of carboxymethyl cellulose in sufficient proportions to cause said body to be effective in coagulating the plasma issuing from a moist lesion to which the dressing is applied.

6. A dressing as described in claim 5, said sodium salt of carboxymethyl cellulose being in aerated porous form in said body.

7. A dressing as described in claim 5, including a medicant in said body for the wound to which the dressing is applied.

8. A dressing as described in claim 5, said sodium salt of carboxymethyl cellulose being present in said body in an amount of 70–85% by weight.

9. A dressing for a wound comprising an aerated sponge-like sheet of elastomeric material and a layer of hemostatic material supported on said sheet.

10. A dressing as described in claim 9, said elastomeric material being polyurethane.

11. A dressing as described in claim 9, said hemostatic material comprising a sodium salt of carboxymethyl cellulose.

12. A dressing for a wound comprising an aerated sponge-like sheet of elastomeric material and a coating of hemostatic material on said sheet of elastomeric material.

13. A dressing for a wound comprising an aerated sponge-like sheet of polyurethane and a coating of sodium salt of carboxymethyl cellulose on said polyurethane sheet.

14. A dressing as described in claim 13, wherein said coating is porous.

15. The method of treating a wound from which plasma flows or oozes, comprising applying to the wound, a flexible body large enough to cover said wound, said body containing a water-soluble, plasma-soluble cellulose derivative having hemostatic and film-forming properties and having the property of combining with the plasma in the wound to form with the plasma an artificial water-insoluble eschar, said cellulose derivative being present in integral non-discrete form in said body and in proportions to cause said body to be effective in coagulating the plasma issuing from said wound.

16. A method as described in claim 15, said cellulose derivative being in porous form.

17. A method as described in claim 15, said body also containing a medicant for the wound, which medicant is released in said plasma, as the cellulose derivative is dissolved in said plasma.

18. A method of treating a wound from which plasma flows or oozes, comprising applying to the wound a flexible body containing a porous sodium salt of carboxymethyl cellulose in amount to cause coagulation of the plasma by the hemostatic action of said cellulose.

19. A method as described in claim 18, the body containing from 70 to 85% of said cellulose.

References Cited

UNITED STATES PATENTS

| | | | |
|---|---|---|---|
| 2,383,047 | 8/1945 | Dreyfus | 18—155 |
| 2,602,042 | 7/1952 | Abbott | 167—84 |
| 2,688,155 | 9/1954 | Nadeau et al. | 18—155 |
| 2,693,438 | 11/1954 | Ward | 167—84 |
| 2,733,211 | 1/1956 | Maxcy et al. | 252—91 |
| 2,734,503 | 2/1956 | Doyle | 128—156 |
| 2,762,077 | 9/1956 | Markowitz | 18—155 |
| 2,764,976 | 10/1956 | Skiles et al. | 128—156 |
| 2,773,000 | 12/1956 | Masci et al. | 167—84 |
| 3,122,479 | 2/1964 | Smith | 167—84 |

FOREIGN PATENTS 121,334 5/1946 Australia.

ALBERT T. MEYERS, *Primary Examiner.*

JULIAN S. LEVITT, *Examiner.*

GEORGE A. MENTIS, *Assistant Examiner.*